(12) United States Patent
Estabrooks et al.

(10) Patent No.: US 11,985,148 B2
(45) Date of Patent: *May 14, 2024

(54) PHYSICAL LAYER ROGUE DEVICE DETECTION

(71) Applicant: Ciena Corporation, Hanover, MD (US)

(72) Inventors: Kevin Estabrooks, Nepean (CA); Greg Vanderydt, Ottawa (CA); Bashar Abdullah, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,614

(22) Filed: Oct. 3, 2022

(65) Prior Publication Data

US 2023/0022973 A1    Jan. 26, 2023

Related U.S. Application Data

(63) Continuation of application No. 15/803,290, filed on Nov. 3, 2017, now Pat. No. 11,470,095.

(51) Int. Cl.

| | | |
|---|---|---|
| *H04L 9/40* | (2022.01) | |
| *H04L 43/08* | (2022.01) | |
| *H04W 12/122* | (2021.01) | |
| *H04W 12/79* | (2021.01) | |
| *H04W 12/0433* | (2021.01) | |

(52) U.S. Cl.
CPC .......... *H04L 63/1416* (2013.01); *H04L 43/08* (2013.01); *H04L 63/1466* (2013.01); *H04L 63/20* (2013.01); *H04W 12/122* (2021.01); *H04W 12/79* (2021.01); *H04L 63/06* (2013.01); *H04W 12/0433* (2021.01)

(58) Field of Classification Search
CPC . H04L 63/06; H04L 63/1408; H04L 63/1416; H04L 63/1466; H04L 63/16; H04L 63/20; H04L 43/08; H04L 43/087
See application file for complete search history.

(56) References Cited

U.S. PATENT DOCUMENTS

| | | |
|---|---|---|
| 7,295,831 B2 | 11/2007 | Coleman et al. |
| 7,724,717 B2 | 5/2010 | Porras et al. |
| 7,965,842 B2 | 6/2011 | Whelan et al. |
| 8,638,657 B1 | 1/2014 | Gopalakrishnan et al. |
| 8,844,041 B1 | 9/2014 | Kienzle et al. |
| 9,049,225 B2 | 6/2015 | Jana et al. |
| 9,628,937 B2 | 4/2017 | Chao et al. |
| 2002/0027886 A1 | 3/2002 | Fischer et al. |
| 2005/0198247 A1 | 9/2005 | Perry et al. |

(Continued)

OTHER PUBLICATIONS

International Telecommunication Union, ITU-T G.8262/Y.1362, Telecommunication Standardization Sector of ITU, Timing characteristics of synchronous Ethernet equipment slave clock, Jan. 2015, pp. 1-38.

*Primary Examiner* — Minh Dinh
(74) *Attorney, Agent, or Firm* — Baratta Law PLLC; Lawrence A. Baratta, Jr.

(57) ABSTRACT

Systems and methods for detecting a rogue network device at a physical layer include monitoring physical layer characteristics of a wired link at both a first network device and a second network device; determining whether there are detectable variances in the physical layer characteristics; and detecting a rogue network device inserted on the link based on the detectable variances.

20 Claims, 11 Drawing Sheets

(56) References Cited

U.S. PATENT DOCUMENTS

| | | |
|---|---|---|
| 2013/0078906 A1 | 3/2013 | Ben Hamida et al. |
| 2014/0380416 A1* | 12/2014 | Adachi .................. H04L 63/20 726/2 |
| 2016/0174072 A1 | 6/2016 | Allyn |
| 2016/0366586 A1 | 12/2016 | Gross et al. |
| 2017/0187594 A1* | 6/2017 | Thubert .................. H04L 41/12 |
| 2018/0013779 A1 | 1/2018 | Aguayo Gonzalez et al. |
| 2018/0069874 A1* | 3/2018 | Saeki ...................... H04L 12/40 |
| 2019/0385057 A1 | 12/2019 | Litichever et al. |

\* cited by examiner

PHYSICAL LAYER ROGUE DEVICE DETECTION

CROSS-REFERENCE TO RELATED APPLICATION(S)

The present disclosure is a continuation of U.S. patent application Ser. No. 15/803,290, filed Nov. 3, 2017, the contents of which are incorporated by reference in their entirety.

FIELD OF THE DISCLOSURE

The present disclosure generally relates to networking systems and methods. More particularly, the present disclosure relates to physical layer rogue device detection systems and methods.

BACKGROUND OF THE DISCLOSURE

Network security is becoming an ever-increasing concern for network operators, and great effort is spent securing data and encrypting communications. One security concern is the so-called Man-in-the-Middle (MitM) attack where a rogue device is inserted in the middle of a network link. Once the rogue device is inserted, it can go undetected, and devices such as network emulators are designed to operate transparently in a network. If such a device is placed in the network, the user can capture data and work to 1) decrypt the data (if it is encrypted), 2) modify packet streams and/or 3) attack the network by placing rogue data on the network. Simply stated, a rogue device can give an attacker unrestricted access to the network. Conventional Layer 2 security measures are designed to prevent attackers from connecting a device directly to a port (creating a link). This is achieved through IEEE 802.1x Port Based Network Access Control. There are no techniques to detect a Man-in-the-Middle attack where a user splices a rogue device into an active link and passes data transparently. Conventional techniques encrypt data with software or use port authentication via passwords, certificates, etc. These security techniques are not guaranteed because rogue users will eventually find a way to crack the encryption and/or authentication. Layer 2 solutions also do not prevent Denial of Service (DoS) attacks as rogue devices inserted in the network can modify and generate packets. Layer 2 security cannot match the effectiveness of Layer 1 security.

BRIEF SUMMARY OF THE DISCLOSURE

In an embodiment, a method of detecting a rogue network device at a physical layer includes obtaining physical layer characteristics of a link between a first network device and a second network device; analyzing the physical layer characteristics of the link; and detecting the rogue network device based on the analyzed physical layer characteristics, wherein the rogue network device was inserted in the link and causes detectable variances in the physical layer characteristics. The physical layer characteristics can include one of noise introduced in clock frequency and jitter. The physical layer characteristics can include noise introduced in clock frequency of Ethernet Equipment Clocks (EECs) and the first network device and the second network device utilize Synchronous Ethernet (SyncE). The method can be performed by a network management system and the obtaining can include the first network device and the second network device providing associated physical layer characteristics securely to the network management system. The network management system can detect the rogue network device based on the link having a mismatch in expected physical layer characteristics from the network management system. The method can be performed by the first network device as a master network device and the obtaining can include the second network device as a slave network device providing associated physical layer characteristics to the first network device. The method can be performed by the first network device as a master network device and the obtaining can include the second network device modifying associated physical layer characteristics on a transmitter interface to the first network device using a shared key such that the first network device is able to detect the associated physical layer characteristics via the shared key. The method can further include, subsequent to detecting the rogue network device, switching traffic between the first network device and the second network device to another link.

In another embodiment, a network device configured to detect a rogue network device connected thereto at a physical layer includes one or more ports; and a controller communicatively coupled to the one or more ports and configured to obtain physical layer characteristics of a link to a second network device; analyze the physical layer characteristics of the link; and detect the rogue network device based on the analyzed physical layer characteristics, wherein the rogue network device was inserted in the link and causes detectable variances in the physical layer characteristics. The physical layer characteristics can include one of noise introduced in clock frequency and jitter. The physical layer characteristics can include noise introduced in clock frequency of Ethernet Equipment Clocks (EECs) and the network device and the second network device utilize Synchronous Ethernet (SyncE). The network device can be a master network device and the obtained physical layer characteristics are from the second network device as a slave network device. The obtained physical layer characteristics can be from the second network device modifying associated physical layer characteristics on a transmitter interface to the network device using a shared key such that the network device is able to detect the associated physical layer characteristics via the shared key. The controller can be further configured to, subsequent to detection of the rogue network device, switch traffic between the network device and the second network device to another link.

In a further embodiment, a management system configured to detect a rogue network device in a network at a physical layer includes a network interface communicatively coupled to a plurality of network devices; a processor communicatively coupled to the network interface; and memory storing instructions that, when executed, cause the processor to obtain physical layer characteristics of a link between a first network device and a second network device; analyze the physical layer characteristics of the link; and detect the rogue network device based on the analyzed physical layer characteristics, wherein the rogue network device was inserted in the link and causes detectable variances in the physical layer characteristics. The physical layer characteristics can include one of noise introduced in clock frequency and jitter. The physical layer characteristics can include noise introduced in clock frequency of Ethernet Equipment Clocks (EECs) and the first network device and the second network device utilize Synchronous Ethernet (SyncE). The obtained physical layer characteristics can be provided securely by the first network device and the second network device. The network management system can detect the rogue network device based on any link having a mismatch in expected physical layer characteristics from the network management system. The memory storing instructions that, when executed, can further cause the processor to, subsequent to detection of the rogue network device, cause traffic to switch between the first network device and the second network device to another link.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to physical layer rogue device detection systems and methods. Specifically, the systems and methods utilize network analytics via a management system to collect data and monitor the data to detect rogue devices. The systems and methods can detect a rogue device at the physical layer using analytics. For example, the systems and methods can detect the Man-in-the-Middle attack at the physical layer by running an analysis on network device Ethernet Equipment Clocks (EECs). Also, the systems and method can detect the Man-in-the-Middle attack by analyzing physical layer characteristics such as latency, jitter, etc. Advantageously, these detection techniques are at the physical layer and thus protocol independent. Note, the physical layer described herein is not a protocol, but rather specific characteristics of the physical network transmission which can be derived and compared such as clock frequency, jitter, latency, etc. This physical layer data is protocol independent in a sense that all protocols have these fundamental transmission characteristics. The systems and methods can analyze this physical layer data to detect unexpected values indicative of an unauthorized or rogue node, network element, or network device. That is, the rogue network device cannot fake or spoof the fundamental transmission characteristics. Since the systems and methods detect attacks at the physical layer, it is impossible for the attacker to prevent detection since the detection is not based on handshakes or other protocol-specific implementations. If an attack is detected, data transmission can be switched to another uncompromised link. This level of security is at the hardware level (physical layer) and offers a level of protection that most attackers would not understand or even contemplate circumventing without specialized hardware.

Figure 1:
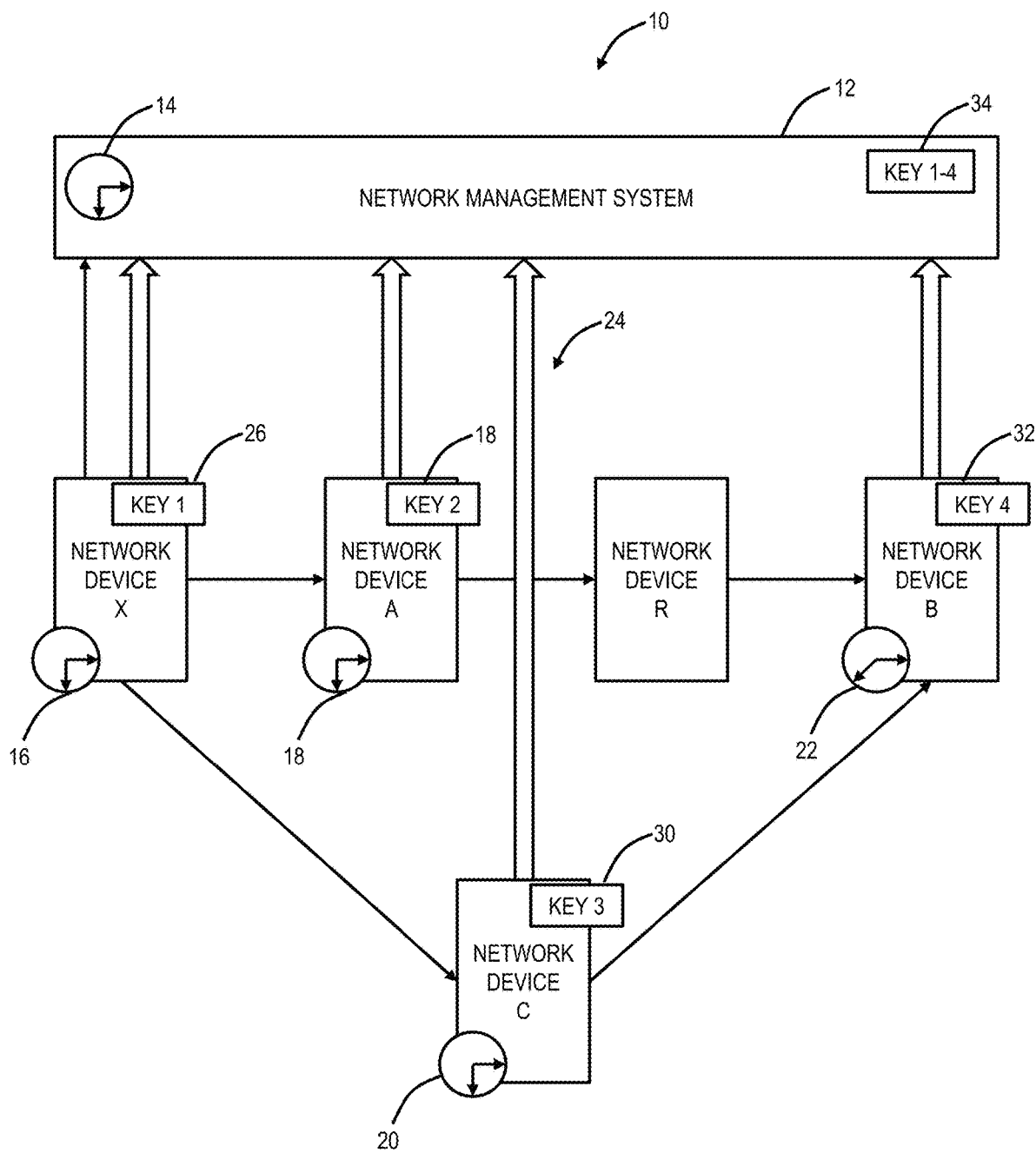
FIG. 1 is a network diagram of a network of network devices X, A, B, C, R and a management system.

In one embodiment, the systems and methods can include recovering an EEC interface frequency (e.g., via Synchronous Ethernet or SyncE), encrypting this value, and sending this value to a management system for analysis. The management system can reconfigure a SyncE timing trail, and this detects a presence of a rogue device on any network link based thereon. The foregoing descriptions illustrate SyncE as an example with deriving clock frequency based on SyncE messaging securely and detecting a frequency mismatch which is indicative of a rogue device. Those skilled in the art will appreciate other synchronized transport approaches are also contemplated and deriving physical layer measurements therein. For example, other protocols could include Optical Transport Network (OTN), Synchronous Optical Network (SONET), Synchronous Digital Hierarchy (SDH), and the like. In general, the systems and methods use a specific protocol to measure physical layer characteristics (e.g., clock frequency, jitter, latency, etc.) and (preferably out-of-band) secure communication mechanisms to share this information. With this information in hand, rogue devices can be detected as they have no way to participate in the secure communication mechanisms to affect the secure data stream, particularly if out of band. Network FIG. 1 is a network diagram of a network 10 of network devices X, A, B, C, R and a management system 12. The network devices X, A, B, C, R can be routers, switches, or other types of network elements. The network devices X, A, B, C, R can communicate with one another through Layer 0 (L0) such as Dense Wavelength Division Multiplexing (DWDM); Layer 1 (L1) such as Optical Transport Network (OTN), Synchronous Optical Network (SONET), Synchronous Digital Hierarchy (SDH), Flexible Ethernet (FlexE), etc.; Layer 2 (L2) such as Ethernet, Multiprotocol Label Switching (MPLS), etc.; Layer 3 (L3) protocols such as Internet Protocol (IP), etc.; and/or combinations thereof. The management system 12 can be an Element Management System (EMS), Network Management System (NMS), Software Defined Networking (SDN) controller or the like.

In this example, the network device R is a so-called rogue device that is inserted in the network 10 for malicious purposes, such as for a Man-in-the-Middle attack, to capture data, to place rogue data in the network 10, etc. As described herein, if the network device R is not operating transparently (from a protocol specific aspect), it could be detected using protocol-specific detection techniques which can detect, for example, port connectivity. However, the network device R could be inserted such as during a maintenance event and could operate transparently (from a protocol perspective) thereby avoiding the protocol-specific detection techniques.

Accordingly, the systems and methods utilize physical layer attributes and analysis thereof to detect the network device R. The physical layer aspect refers to the fact that the attributes are not protocol-specific, but inherent physical characteristics of packets, frames, Protocol Data Units (PDUs), etc. That is, the management system 12 is configured to analyze the physical layer attributes to detect subtle signal transmission differences which are indicative of an extra network device, i.e., the rogue network device R.

Roque Device Detection Utilizing SyncE

In one example, the systems and methods utilize/leverage SyncE such as defined in ITU-T Recommendation G.8262/ Y.1362 "timing characteristics of synchronous Ethernet equipment slave clock," (08/07, 07/10, and 01/15), the contents of which are incorporated herein by reference. The following description references the SyncE embodiment, but those skilled in the art will recognize other protocols can be used along with their associated physical layer characteristics.

The network management system 12 and each of the network devices X, A, B, C utilizes SyncE and has an associated clock 14, 16, 18, 20, 22, which can be an EEC. The network devices X, A, B, C synchronize their clock 16, 18, 20, 22 to the clock 14 in the network management system 12 via a SyncE timing trail. The SyncE timing trail includes SyncE timing messages that are sent, such as between the network management system 12 and the network devices X, A, B, C.

The network management system 12 acts as a primary reference clock 14 and delivers a clock signal via SyncE to the network device X which sets its clock 16. The network device X sends the clock 16 to the clocks 18, 20 in the network devices A, C, and the network device A sends the clock 18 to the clock 22 in the network device B (also, the network device C can send the clock 20 to the clock 22 in the network device B). This effectively tunes all of the clocks 16, 18, 20, 22 (EECs) in the network 10 to the same frequency as that of the network management system 12.

The network 10 can include multiple network devices in large timing trails, e.g., 10 or more devices. Given that SyncE operates at the physical layer, network timing is highly accurate. Conventional network management systems do not currently monitor device clocks 16, 18, 20, 22. Note, the systems and methods described herein the network management system 12 can detect if any of the EEC clocks 16, 18, 20, 22 are out of sync. Based on the loss of sync, the systems and methods can detect the rogue network device R. Note, the rogue network device R in a link can be detected because the transceivers on the rogue network device R would be out of sync with all other transceivers in the network 10.

In one embodiment, the network devices X, A, B, C can send an encrypted message (denoted by arrows 24) to the network management system 12 which contains their EEC clock 16, 18, 20, 22 frequency hashed with a shared private key 26, 28, 30, 32. The network management system 12 can compare the received hashed frequencies and note if any are not in sync (i.e., differ) from the clock 14 at the network management system 12. If the EEC clock frequency is not in sync, it is indicative of the rogue network device R in the network 10 which breaks network synchronization.

For example, in FIG. 1, the network device B will not send the correct hash to the network management system 12. This is because the rogue network device R broke the timing trail and the network device B sends the hashed EEC clock frequency of the rogue network device R which is substantially different from the clock 14 of the network management system 12 (the head of the timing trail).

In case the network device B wants to check the link to the network device C, the network device B could recover the clock 20 from that link and send the hash to the network management system 12. For example, switching could be coordinated by the network management system 12 to allow detection on every network link.

Each of the network devices X, A, B, C can communicate to the network management system 12 with a unique key 26, 28, 30, 32, so the rogue network device R could not spoof a packet and send it to the management system 12. If the rogue network device R was sophisticated enough to employ SyncE, it still could be detected as every network device X, A, B, C will introduce noise on a link.

Also, the systems and methods can omit the network management system 12 in an embodiment as described herein. Further, the systems and methods could also be used to monitor a timing trail, e.g., currently, the network devices do not message a management system to determine their clock accuracy in SyncE.

Figure 2:
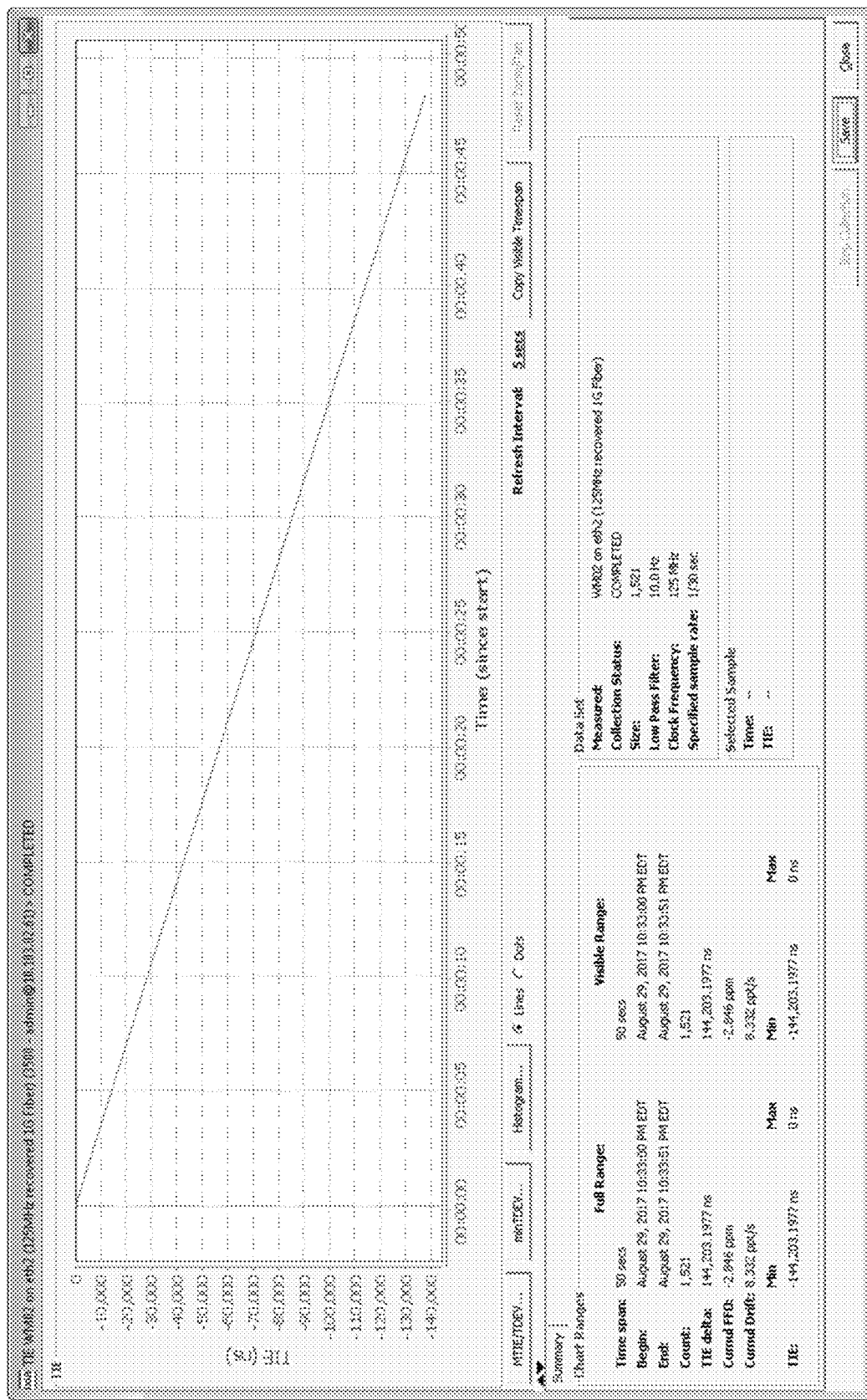
FIG. 2 is a graph of two transceivers that are out of sync.

FIG. 2 is a graph illustrating two transceivers that are out of sync. Specifically, FIG. 2 graphs the timing difference over time, such as the link between the network devices R, B. The link can still transmit and receive data, but from a sync perspective, the difference in frequencies is easily detectable.

Of note, the timing difference caused by the rogue network device R does not cause packet loss. In terms of being "within tolerance," any network device that is not SyncE capable is completely out of tolerance from a timing perspective, but from a packet perspective, it is absolutely within tolerance. It is expected that the vast majority of rogue network devices R are not SyncE compatible and thus completely out of tolerance from a timing perspective. However, if the rogue network device R is SyncE capable, the detection processes herein are still capable of detection. A rogue network device R that is SyncE capable still has to get the SyncE configuration correct. Also, the management system 12 and the valid network devices can configure with one another using encryption which is inaccessible by the rogue network device R. SyncE timing alignment is very precise. For example, a network device can measure clock alignment within a fraction of a nanosecond (in the picosecond range). Thus, 99.9999% of rogue devices (not SyncE capable) will simply be out of sync and noise detection is somewhat irrelevant. A rogue network device R that is SyncE capable and specifically engineered to circumvent this detection technique will produce a small amount of noise that can be detected as described herein.

Roque Device Detection Process

Figure 3:
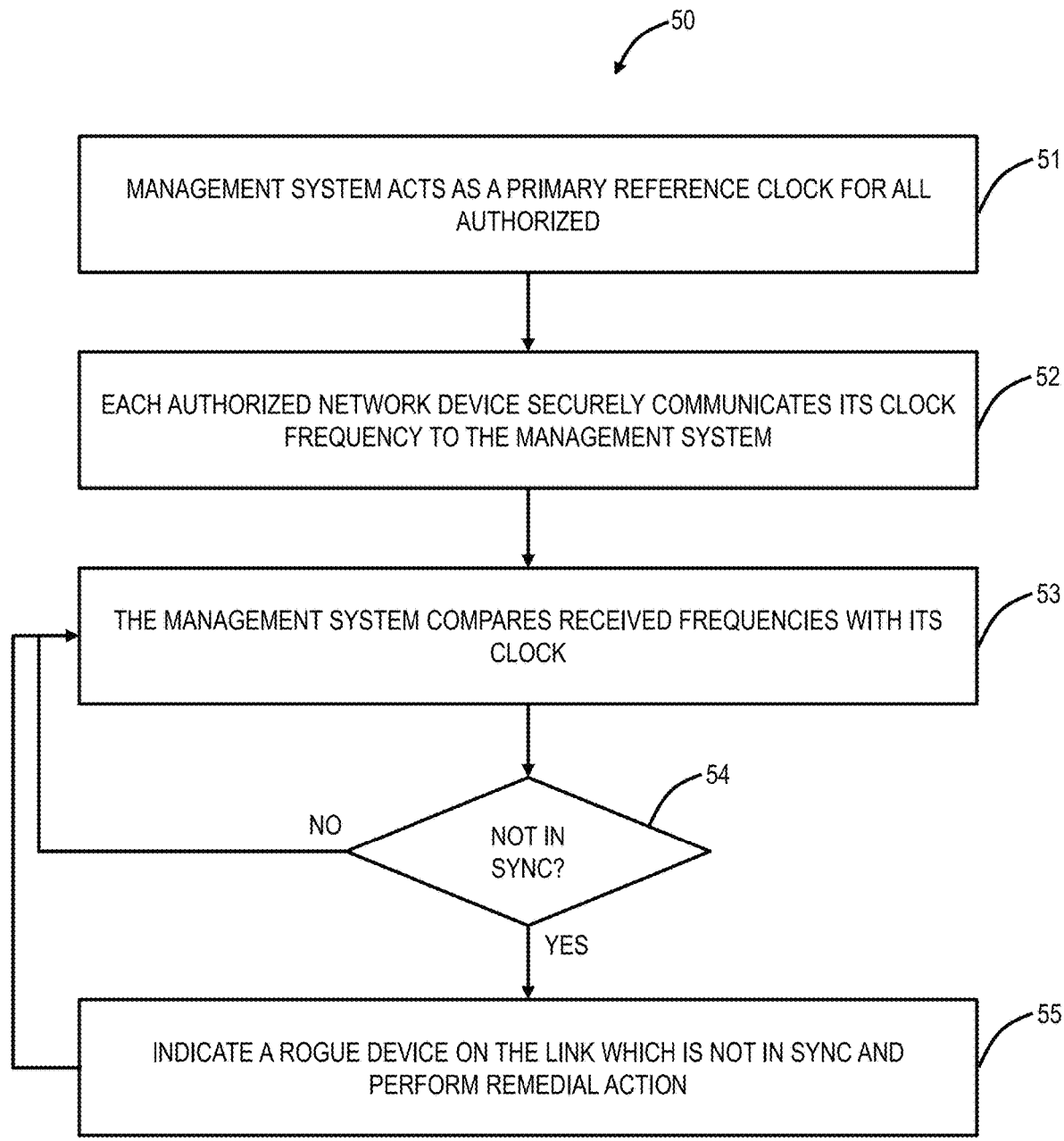
FIG. 3 is a flowchart of a first rogue device detection process utilizing the network management system.

FIG. 3 is a flowchart of a first rogue device detection process 50 utilizing the network management system 12. The network management system 12 acts as a primary reference clock and provides its clock 14 to all authorized network devices (step 51). In an embodiment utilizing SyncE, this can be performed using SyncE messaging. Each authorized network device securely communicates its clock frequency to the network management system 12 (step 52). Again, this can be performed using SyncE messaging and using shared private keys. The network management system 12 compares received frequencies with its clock 14 which is acting as the primary reference clock (step 53). If any previously authorized device is not in sync with the network management system (step 54), the process 50 includes an indication of a rogue network device on the associated link where the previously authorized device is not in sync and a remedial action is performed (step 55). Note, in FIG. 1, the network device B will not be in sync on the link towards the network device A because the rogue network device R is inserted therein. Since the clock 22 is out of sync with the clocks 16, 18 and the clock 14 at the management system, the presence of the rogue network device R is inferred. For the remedial action, the network operator can analyze the link and physically detect/remove the rogue network device R. Note the detection process is able to isolate the rogue network device R to a particular link and ports, e.g., between the ports on the network devices A, B.

Figure 4:
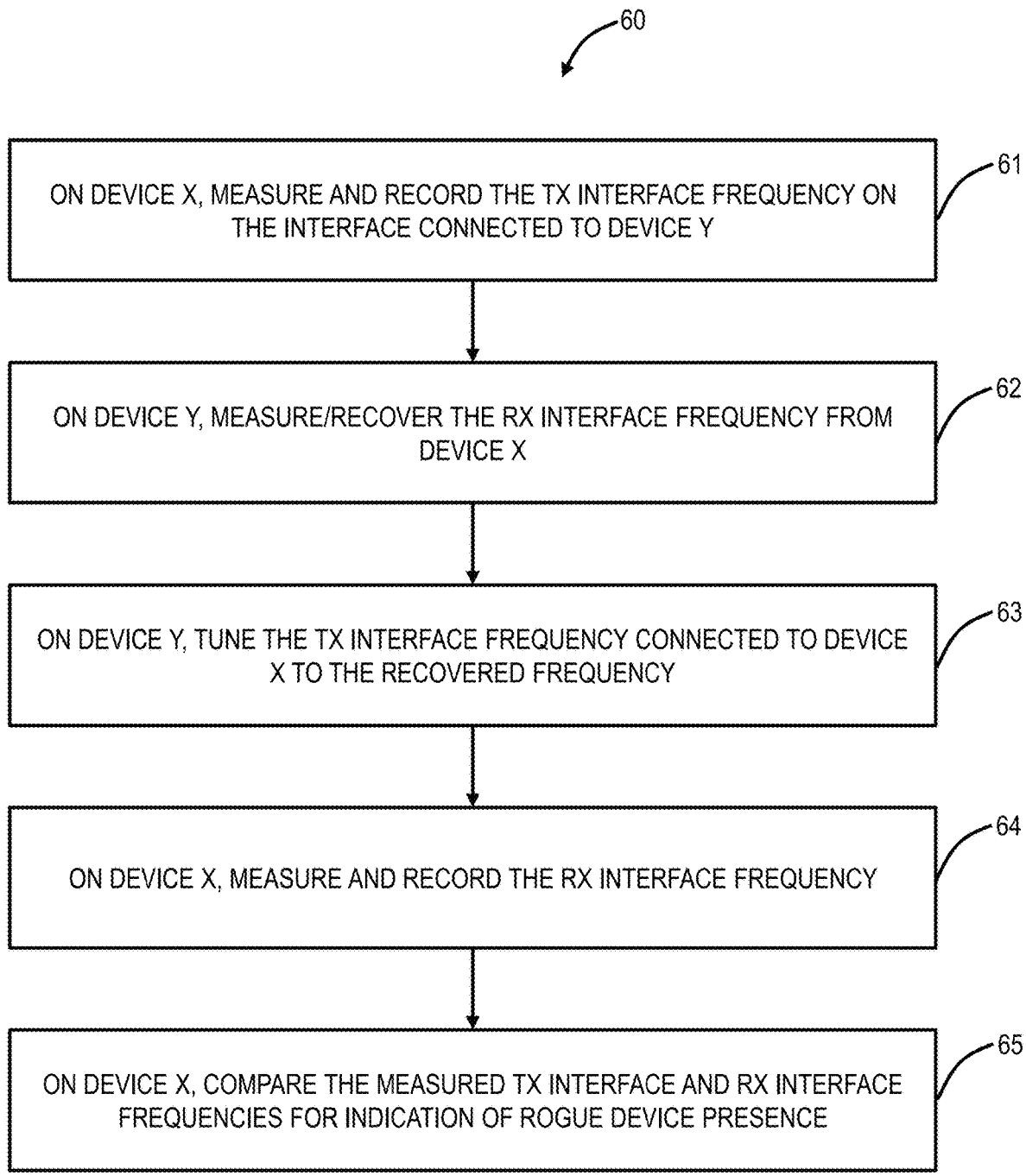
FIG. 4 is a flowchart of a second rogue device detection process without utilizing the network management system.

FIG. 4 is a flowchart of a second rogue device detection process 60 without utilizing the network management system 12. The detection process 60 eliminates the requirement for the central network management system 12 to perform the detection. Instead, the detection is performed by and between adjacent network devices X, Y to detect a rogue network device R therebetween. In the network 10, the process 60 can be implemented on each link, whereas the process 50 can be implemented globally by the network management system 12.

The process 60 includes, on the network device X, measuring and recording the transmitter (TX) interface frequency on the interface connected to network device Y (step 61). On the network device Y, the process 60 includes measuring/recovering the receiver (RX) interface frequency from the network device X (step 62) and tuning the TX interface frequency connect to the network device X to the recovered frequency (step 63). On the network device X, the process 60 includes measuring and recording the RX interface frequency from the network device Y (step 64) and comparing the measured TX interface frequency and RX interface frequency for indication of the presence of the rogue network device R (step 65).

For example, if the RX interface frequency on the network device X only includes known noise introduced by the network device Y, a rogue device R is not present. This measurement is made by comparing the TX and RX frequencies on the network device X. If the RX frequency on network device X includes noise greater than the noise introduced by the network device Y, a rogue device R is present. This measurement is made by comparing the TX and RX frequencies on network device X. Note, in this scenario, the network device X can be referred to as the master and the network device Y as the slave. Thus, on each link, one of the network devices needs to be designated the master. This can be through any approach, such as random, based on some unique characteristic (e.g., higher or lower node ID), etc. The master performs the analysis of frequencies and can raise an alarm (trap) based on frequency mismatch indicative of the rogue device.

Figure 5:
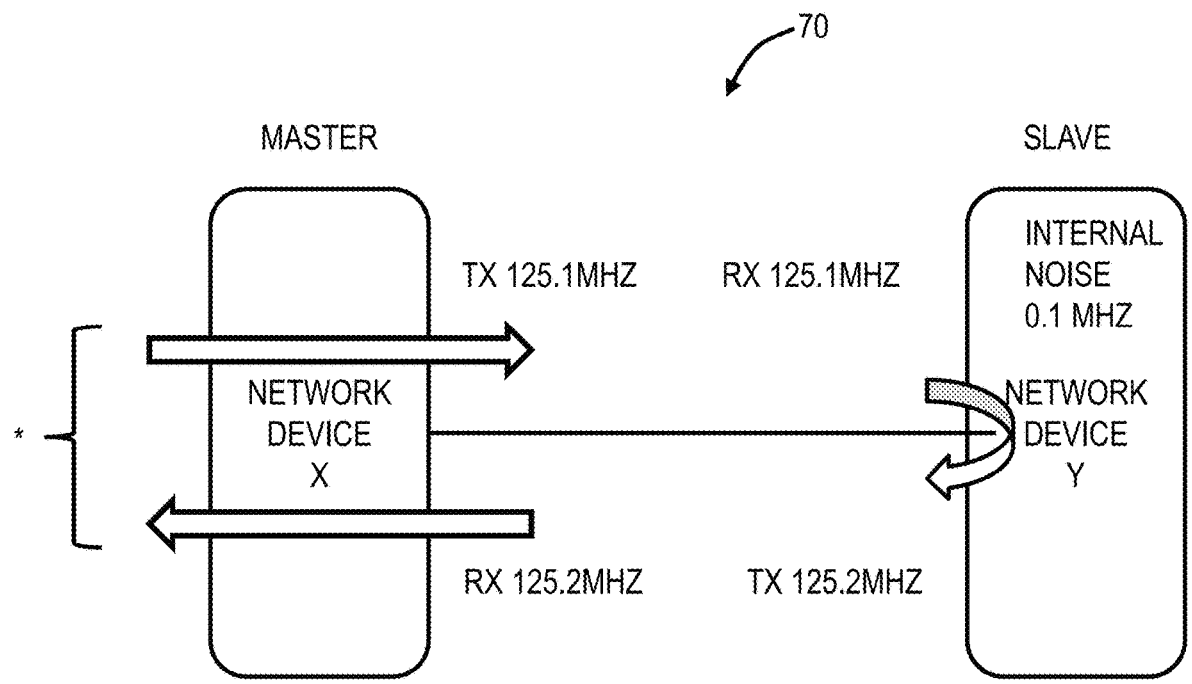
FIG. 5 is a network diagram of a network implementing the second rogue device detection process of FIG. 4 without a rogue network device on the link.
Figure 6:
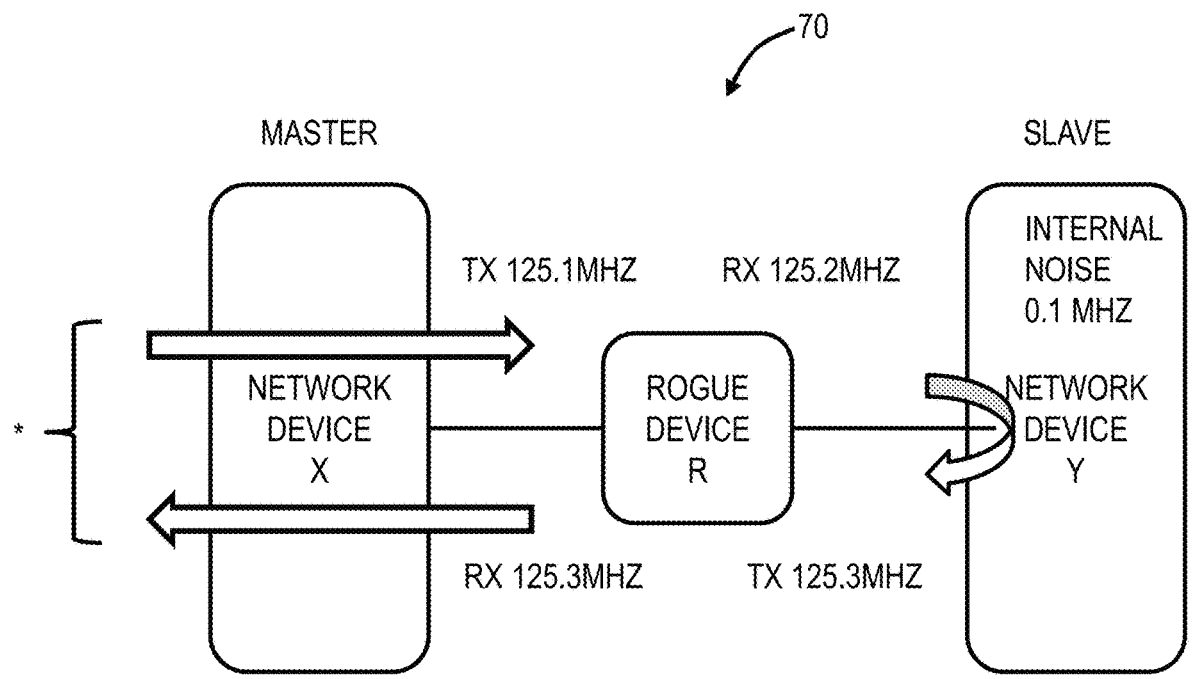
FIG. 6 is a network diagram of the network of FIG. 5 implementing the second rogue device detection process of FIG. 4 with the rogue network device on the link.

FIGS. 5 and 6 are network diagrams of a network 70 between the network devices X, Y with (FIG. 6) and without (FIG. 5) the rogue network device R. In FIG. 5, the master network device X has a TX interface frequency of 125.1 MHz and the slave network device Y has an RX interface frequency of 125.1 MHz, based on synchronization with the TX interface frequency of the master network device X. The slave network device Y can have internal noise of about 0.1 MHz, and thus its TX interface frequency is 125.2 MHz (+0.1 MHz from the RX interface frequency based on the internal noise. Thus, the master network device X has an RX interface frequency of 125.2 MHz. Thus, the master network device X can analyze the TX interface frequency of 125.1 MHz, and the RX interface frequency of 125.2 MHz to determine that only noise detected is the expected noise on the slave network device Y. Thus a rogue device is not present on the link.

In FIG. 6, the rogue device R is present between the master network device X and the slave network device Y. Again, the master network device X has a TX interface frequency of 125.1 MHz. However, the slave network device Y has an RX interface frequency of 125.2 MHz as it syncs to the rogue network device R's clock (even though the slave network device Y is unaware of the presence of the rogue network device R). With the internal noise of 0.1 MHz at the slave network device Y, the TX interface frequency is 125.3 MHz which is +0.1 MHz based on the internal noise. Thus, the RX interface frequency at the master network device X can be 125.3 MHz (or 125.4 MHz if there is internal noise of the same amount in the rogue network device R), etc. Accordingly, the master network device X detects noise greater than the noise generated by the slave network device Y at its RX interface; thus, the rogue network device R is detected.

Every network device on a network 10, 70 will create "noise." Noise generation is a property of all Ethernet equipment clocks (EECs) as well as other protocol clocks. ITU-T G.8262 describes the tolerances that an EEC must meet in order to deliver sync as a service via SyncE. If the rogue network device R employs SyncE to circumvent this detection technique, the rogue network device R will still generate noise. It is extremely difficult to create a device that does not generate noise. Also, in addition to noise, the systems and methods could use any physical layer characteristic.

For example, the systems and methods could also include jitter. Signal jitter can be described as short-term variations with frequency greater than or equal to 10 Hz. Similar to noise, if the rogue network device R employs SyncE, or another synchronous signal, to circumvent this detection technique, the rogue network device R will introduce jitter, thereby altering the jitter characteristics of the signal. It is extremely difficult to create a device that does not introduce jitter.

Figure 7:
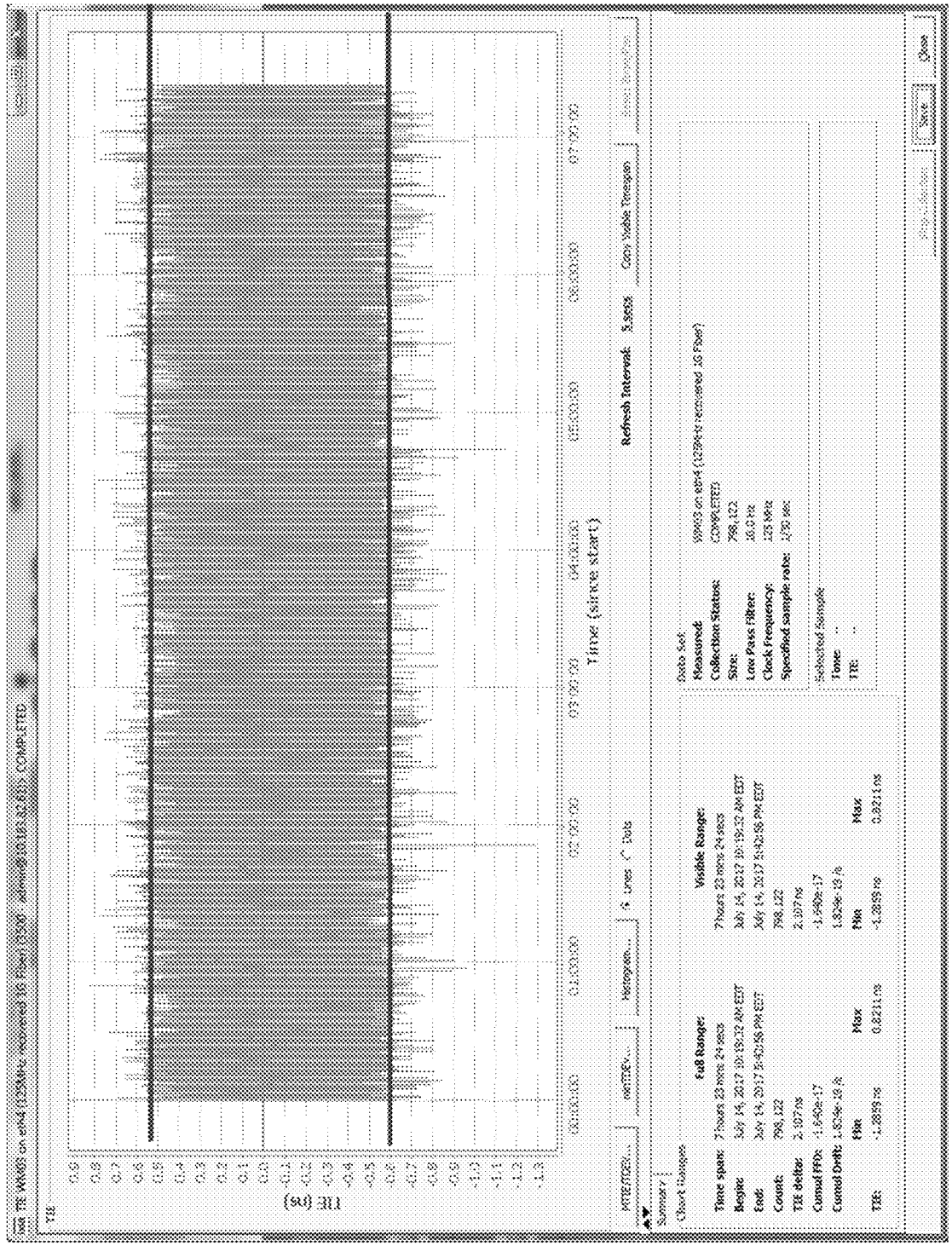
FIG. 7 is a graph of noise generated by the master network device X when directly connected to the slave network device Y as in FIG. 5.
Figure 8:
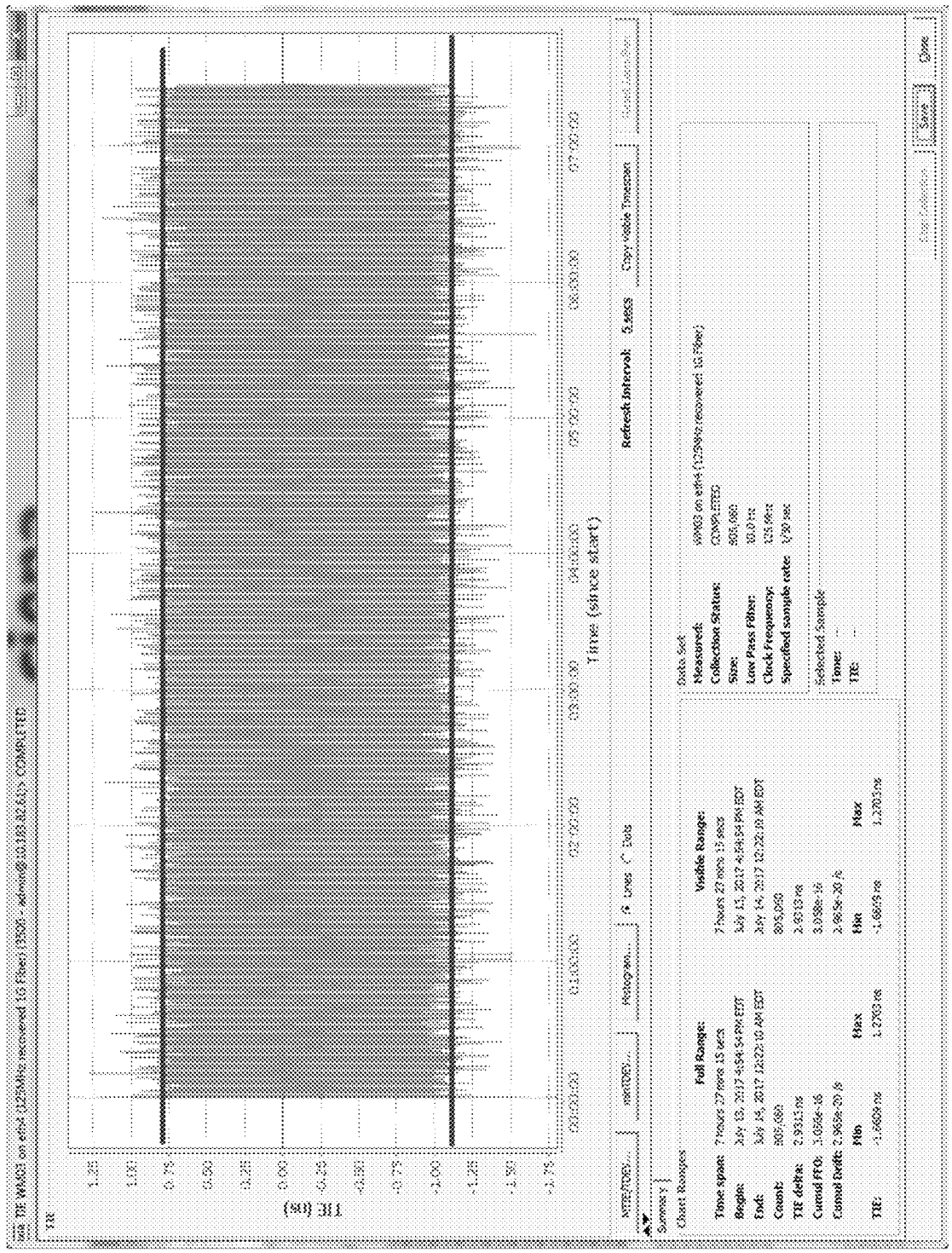
FIG. 8 is a graph of noise generated by the master network device X when the rogue network device R is inserted into the link between the slave network device Y as in FIG. 6.

FIGS. 7 and 8 are graphs illustrating noise generated by a SyncE capable network device. Specifically, these graphs illustrate that even a sophisticated network device could not go undetected. Of course, any device that is not SyncE capable (i.e., unsophisticated) would be detected right away as the frequency offset would be large in comparison to a SyncE device. FIG. 7 is a graph of noise generated by the master network device X when directly connected to the slave network device Y as in FIG. 5. The noise generated by the slave network device Y (time interval error) is approximately 1.1 ns.

FIG. 8 is a graph of noise generated by the master network device X when the rogue network device R is inserted into the link between the slave network device Y as in FIG. 6. The noise generated by the slave network device Y and the rogue network device R is 1.9 ns, almost double the noise the master network device X is expecting. This example demonstrates a case where the user tries to circumvent the detection method, but is unable to do so even with the most sophisticated rogue network device R. Thus, even with the most sophisticated rogue network device R attempting to operate as a Man-in-the-Middle as transparently as possible, there will be excessive noise on the link indicative of the presence of the rogue network device R.

Figure 9:
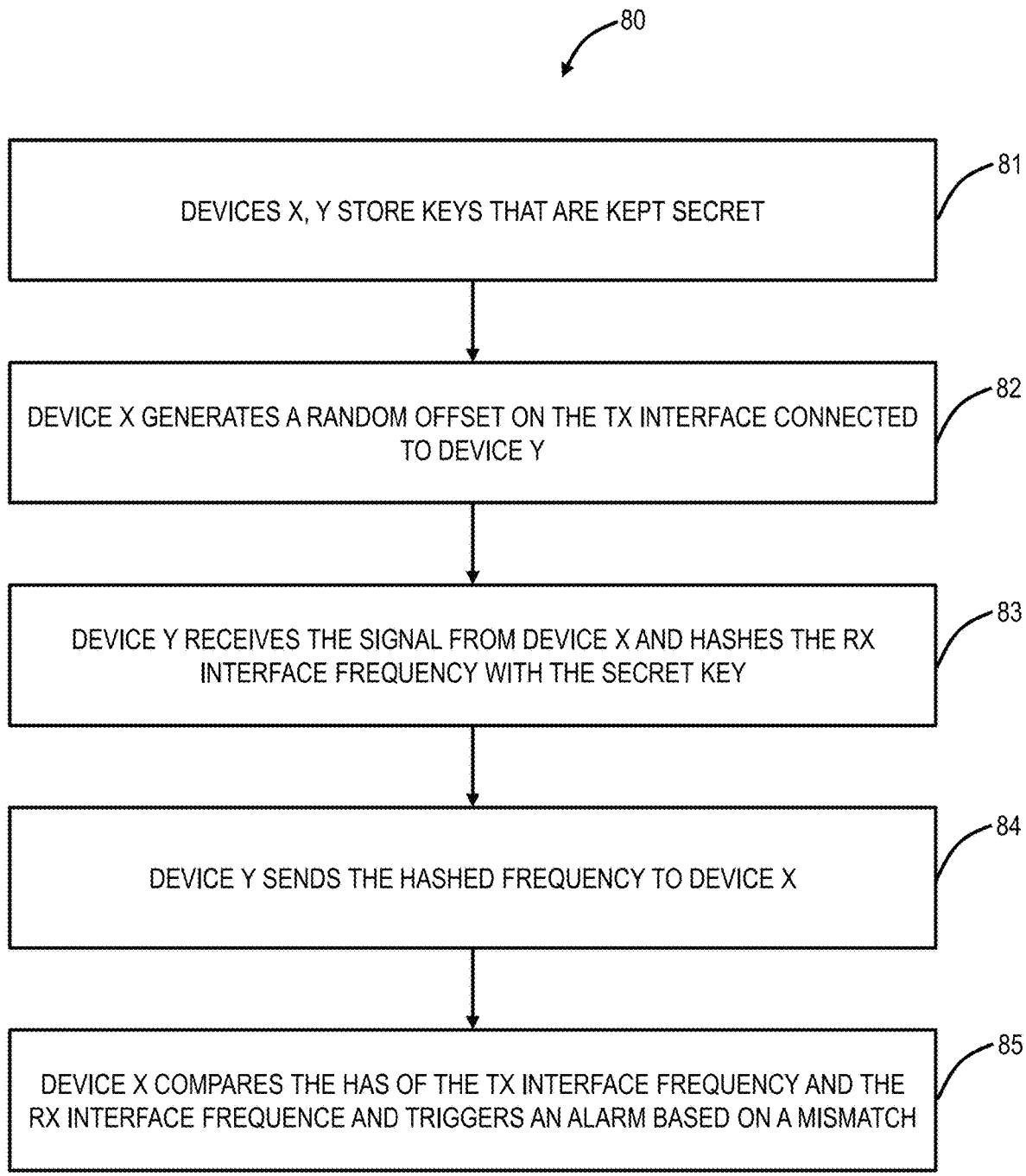
FIG. 9 is a flowchart of a third rogue device detection process with enhancements to offer a greater level of rogue network device detection.

FIG. 9 is a flowchart of a third rogue device detection process 80 with enhancements to offer a greater level of rogue network device detection. Specifically, the rogue device detection process 80 provides enhancement to the rogue device detection processes 50, 60. Transceivers, such as Ethernet transceivers can operate within a certain level of tolerance. Thus, jitter and an offset can be introduced into a link, and the data can still be transmitted and received without error. SyncE capable devices are designed/tested to ensure they can tolerate a specific amount of jitter without causing bit errors. Thus, the enhancement can include the introduction of jitter and/or an offset within the tolerance level.

The rogue device detection process 80 includes the network devices X, Y storing keys that are kept secret (step 81). The network device X generates a random offset in frequency on the TX interface frequency connected to the network device Y (step 82). Again, this offset is constrained to within the tolerance limits. The network device Y receives the signal from the network device X and hashes the RX interface frequency with the secret key X (step 83). The network device Y sends the hashed frequency to the network device X (step 84). The network device X compares the hash of the TX interface frequency and the RX interface frequency and triggers an alarm based on a mismatch (step 85).

The enhanced technique has an added layer of security in that the rogue network device R cannot generate the correct frequency without the key. This prevents the scenario where a rogue network device tries to trick the master network device X into believing it is the slave network device Y.

Figure 10:
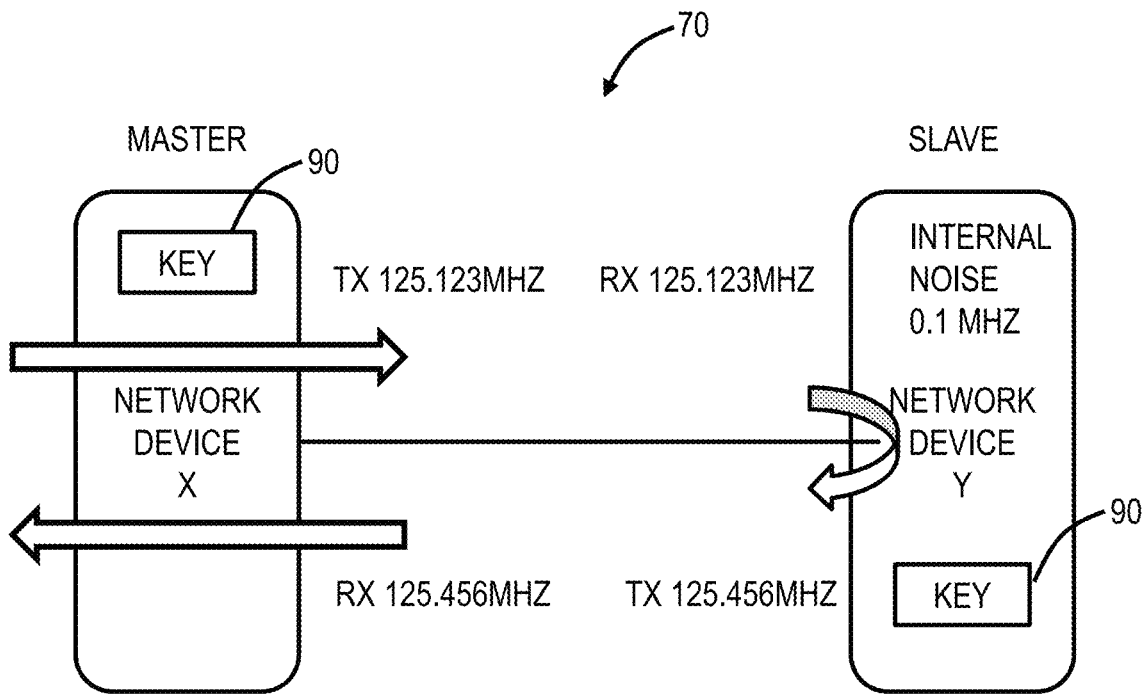
FIG. 10 is a network diagram of the network between the network devices X, Y without the rogue network device and implementing the rogue device detection process.

FIG. 10 is a network diagram of the network 70 between the network devices X, Y without the rogue network device and implementing the rogue device detection process 80. Here, both the master network device X and the slave network device Y have a shared key 90; any rogue network device R would not have the shared key 90. The master network device X has a TX interface frequency of 125.123 MHz and the slave network device Y syncs its RX interface frequency to 125.123 MHz. The slave network device Y still has the internal noise of 0.1 MHz. However, the slave network device Y hashes the TX interface frequency of 125.123 MHz from the master network device X with the shared key 90 to yield a value of, e.g., 125.456 MHz which is used by the slave network device Y for its TX interface frequency. The master network device X thus has an RX interface frequency of 125.456 MHz. The master network device X can also have its TX interface frequency of 125.456 MHz with the shared key 90 to return the value of 125.456 MHz. Now, the master network device X can detect that the TX interface frequency from the slave network device Y is 125.456 MHz, as expected and indicating the master network device X is communicating to the slave network device Y.

Of note, the rogue network device R does not participate in communication with the management system 12 or with the peer network devices X, Y. Also, the communication between peer network devices X, Y and the management system 12 can be encrypted via the keys that the management system 12 and network devices X, Y share. Thus, this communication is protected from the rogue network device R. At best, the rogue network device R would need to be placed on the network to gather packets and decrypt them, but as soon and the rogue network device R is added, this technique detects the rogue network device R and would move traffic to an uncompromised link. Even if the rogue network device R tries to spoof messages, this is prevented by adding an offset. Also, the rogue network device R needs to be placed on the actual link it is trying to compromise as the rogue network device R needs a physical reading (frequency) from the link to create the correct encrypted message for the management system 12.

In an embodiment, a rogue detection process includes obtaining physical layer characteristics of a link between a first network device and a second network device; analyzing the physical layer characteristics of the link; and detecting the rogue network device based on the analyzed physical layer characteristics, wherein the rogue network device was inserted in the link and causes detectable variances in the physical layer characteristics. The physical layer characteristics can include clock frequency, such as frequency of Ethernet Equipment Clocks (EECs) and the first network device and the second network device utilize Synchronous Ethernet (SyncE).

The rogue detection process can be performed by the network management system 12, and the obtaining can include the first network device and the second network device providing associated physical layer characteristics securely to the network management system 12. The network management system 12 detects the rogue network device based on any link having a mismatch in expected physical layer characteristics from the network management system 12.

The rogue detection process can be performed by the first network device X as a master network device and the obtaining can include the second network device Y as a slave network device providing associated physical layer characteristics to the first network device X. The rogue detection process can be performed by the first network device X as a master network device and the obtaining can include the second network device Y modifying associated physical layer characteristics on a transmitter interface to the first network device X using a shared key 90 such that the first network device X is able to detect the associated physical layer characteristics via the shared key 90.

The rogue detection process can further include, subsequent to detecting the rogue network device, switching traffic between the first network device and the second network device to another link.

SyncE

In SyncE as the example protocol, to make the processes 60, 80 work at the device level, the network devices X, Y would need to alternate between master and slave as SyncE devices are not capable of sending and receiving a SyncE signal simultaneously. For example, when the slave network device receives a clock signal, after a period it will enter a holdover state and send the signal back to the master network device which will then recover the signal (act as a slave). The timing trail would "reverse" direction allowing master network devices to analyze the clock signal, which should be its own signal reflected.

Network Management System

Figure 11:
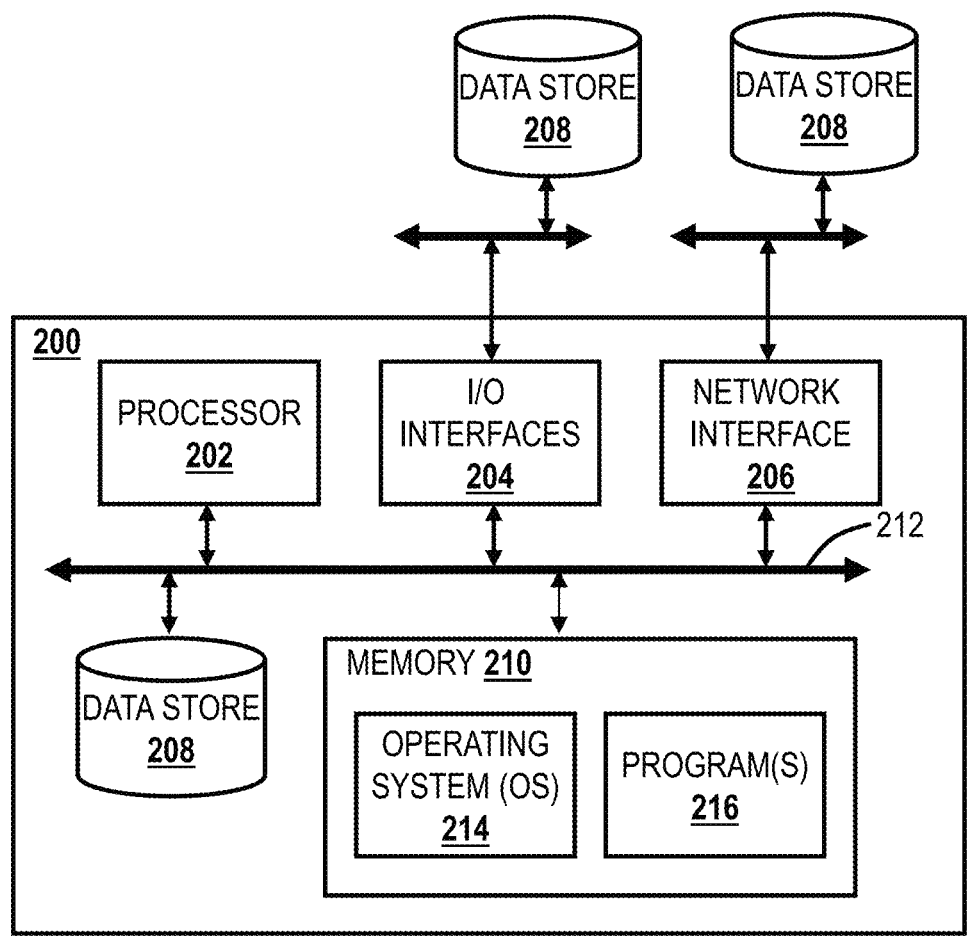
FIG. 11 is a block diagram of a server which may be used to implement the network management system.

FIG. 11 is a block diagram of a server 200 which may be used to implement the network management system 12. In the rogue device detection process 50, the various network devices are configured to forward their physical layer characteristics to the network management system 12 which in turn performs the detection analysis. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 11 depicts the server 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. The system output may be provided via a display device and a printer (not shown). I/O interfaces 204 may include, for example, a serial port, a parallel port, a small computer system interface (SCSI), a serial ATA (SATA), a PCI Express interface (PCI-x), an infrared (IR) interface, a radio frequency (RF) interface, and/or a universal serial bus (USB) interface.

The network interface 206 may be used to enable the server 200 to communicate over a network, such as the Internet, a wide area network (WAN), a local area network (LAN), and the like, etc. The network interface 206 may include, for example, an Ethernet card or adapter or a wireless local area network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

In an embodiment, the network management system 12 is configured to detect a rogue network device R in a network 10 at a physical layer. The network management system 12 includes a network interface 206 communicatively coupled to a plurality of network devices; a processor 202 communicatively coupled to the network interface 206; and memory 210 storing instructions that, when executed, cause the processor 202 to obtain physical layer characteristics of a link between a first network device and a second network device; analyze the physical layer characteristics of the link; and detect the rogue network device based on the analyzed physical layer characteristics, wherein the rogue network device was inserted in the link and causes detectable variances in the physical layer characteristics.

The physical layer characteristics can include clock frequency, such as frequency of Ethernet Equipment Clocks (EECs) and the first network device and the second network device utilize Synchronous Ethernet (SyncE). The obtained physical layer characteristics can be provided securely by the first network device and the second network device. The network management system 12 detects the rogue network device R based on any link having a mismatch in expected physical layer characteristics from the network management system 12. The memory 210 storing instructions that, when executed, further cause the processor 202 to, subsequent to detection of the rogue network device, cause traffic to switch between the first network device and the second network device to another link.

Network Device

Figure 12:
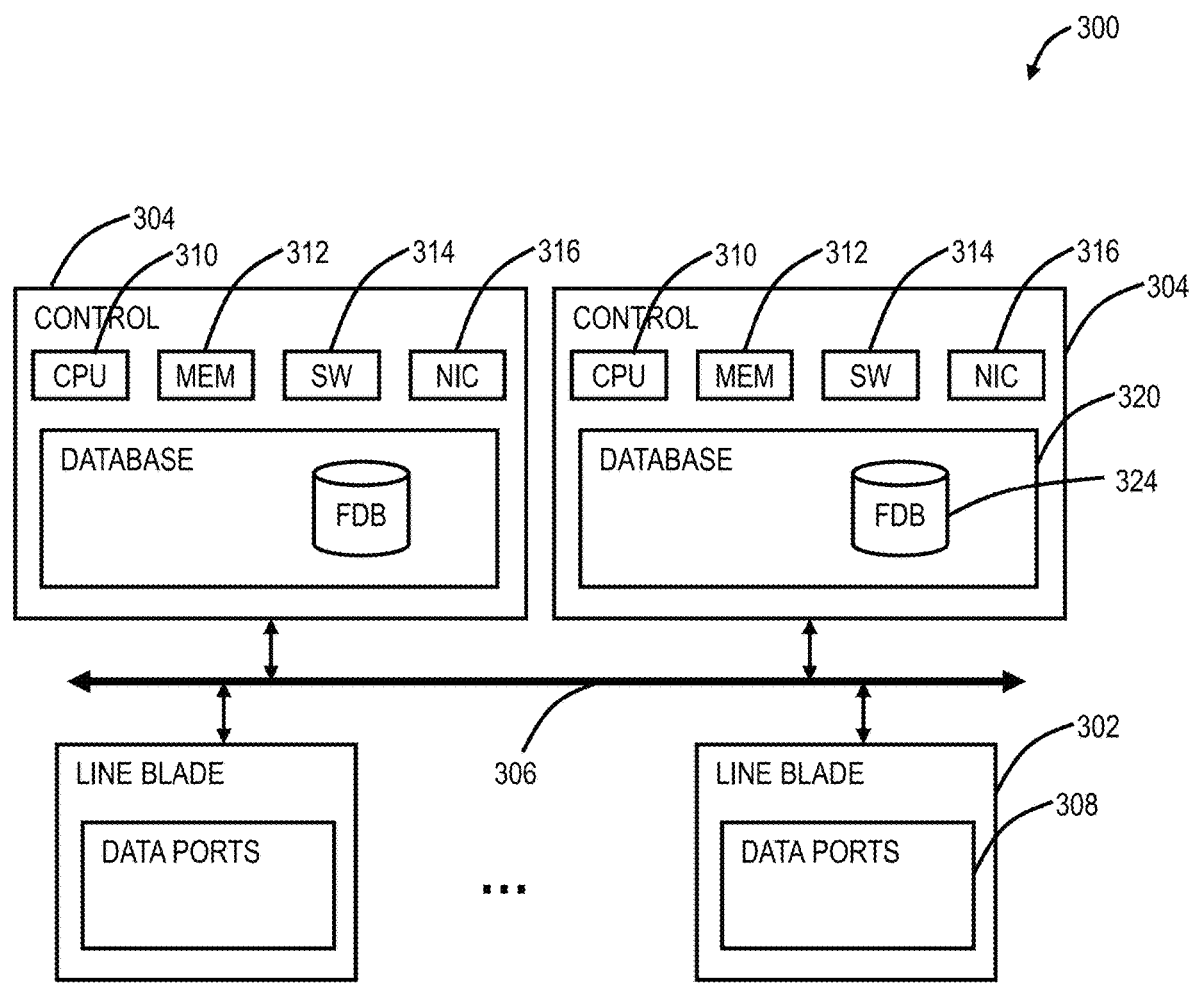
FIG. 12 is a block diagram of an example implementation of a network device.

FIG. 12 is a block diagram of an example implementation of a network device 300. For example, the network device 300 is an Ethernet network switch, but those of ordinary skill in the art will recognize other types of network elements and other implementations are contemplated, such as, for example, a layer two switch integrated within an optical network element. The network device 300 can include one or more blades 302, 304 interconnected via an interface 306. The blades 302, 304 are also known as line cards, line modules, circuit packs, pluggable modules, etc. and generally refer to components mounted within a chassis, shelf, etc. of a data switching device, i.e., the network device 300. Alternatively, the functionality of each of the blades 302, 304 may be integrated into a single module such as in a layer two switch integrated within an optical network element. Further, the functionality of each of the blades 302, 304 may be integrated into a single hardware device, such as a pizza box switch (1U). That is, the blades 302, 304 represent functionality and various hardware, and physical implementations may vary.

Each of the blades 302, 304 may include numerous electronic devices and optical devices mounted on a circuit board along with various interconnect including interfaces to the chassis, shelf, etc. Two example blades are illustrated with line blades 302 and control blades 304. The line blades 302 generally include data ports 308 such as a plurality of Ethernet ports. For example, the line blade 302 may include a plurality of physical ports disposed on an exterior of the blade 302 for receiving ingress/egress connections. Additionally, the line blades 302 may include switching components to form a switching fabric via the interface 306 between all of the data ports 308 allowing data traffic to be switched between the data ports 308 on the various line blades 302. The switching fabric is a combination of hardware, software, firmware, etc. that moves data coming into the network device 300 out by the correct port 308 to the next network element. The switching fabric includes switching units, or individual boxes, in a node; integrated circuits contained in the switching units; and programming that allows switching paths to be controlled.

The control blades 304 include a microprocessor 310, memory 312, software 314, and a network interface 316. Specifically, the microprocessor 310, the memory 312, and the software 314 may collectively control, configure, provision, monitor, etc. the network device 300. The network interface 316 may be utilized to communicate with an element manager, a network management system, etc. Additionally, the control blades 304 may include a database 320 that tracks and maintains provisioning, configuration, operational data and the like. The database 320 may include a forwarding database (FDB) 324. In this example, the network device 300 includes two control blades 304 which may operate in a redundant or protected configuration such as 1:1, 1+1, etc. In general, the control blades 304 maintain dynamic system information including Layer 2 forwarding databases, protocol state machines, and the operational status of the ports 308 within the network device 300.

In an embodiment, the network device 300 is configured to detect a rogue network device R connected thereto at a physical layer. The network device 300 includes one or more ports 308; and a controller 304 communicatively coupled to the one or more ports 308 and configured to obtain physical layer characteristics of a link to a second network device; analyze the physical layer characteristics of the link; and detect the rogue network device based on the analyzed physical layer characteristics, wherein the rogue network device was inserted in the link and causes detectable variances in the physical layer characteristics.

The physical layer characteristics can include clock frequency, such as frequency of Ethernet Equipment Clocks (EECs) of the network device and the second network device utilizing Synchronous Ethernet (SyncE). The network device can be a master network device and the obtained physical layer characteristics are from the second network device operating as a slave network device. The obtained physical layer characteristics are from the second network device modifying associated physical layer characteristics on a transmitter interface to the network device using a shared key 90 such that the network device is able to detect the associated physical layer characteristics via the shared key 90. The controller can be further configured to, subsequent to detection of the rogue network device, switch traffic between the network device and the second network device to another link.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of detecting a rogue network device at a physical layer, the method comprising:
   monitoring physical layer characteristics of a wired link at both a first network device and a second network device;
   determining whether there are detectable variances in the physical layer characteristics; and
   detecting a rogue network device inserted on the link based on the detectable variances, wherein the detectable variances relate to noise in the physical layer and the rogue device is detected based on the noise being greater than expected noise generated by either the first network device or the second network device.

2. The method of claim 1, wherein the rogue device is a man-in-the-middle between the first network device and the second network device.

3. The method of claim 1, wherein the physical layer characteristics include noise introduced in clock frequency.

4. The method of claim 1, wherein the physical layer characteristics include noise introduced in jitter.

5. The method of claim 1, wherein the physical layer characteristics include noise introduced in clock frequency of Ethernet Equipment Clocks (EECs).

6. The method of claim 1, wherein the monitoring includes receiving encrypted values of the physical layer characteristics from each of the first network device and second network device.

7. The method of claim 6, wherein the values are clock frequency.

8. The method of claim 1, wherein the method is performed by a network management system.

9. The method of claim 1, wherein the method is performed by the first network device as a master network device and the obtaining comprises the second network device as a slave network device providing associated physical layer characteristics to the first network device.

10. The method of claim 1, further comprising:
subsequent to detecting the rogue network device, switching traffic between the first network device and the second network device to another link.

11. A non-transitory computer-readable medium, for detecting a rogue network device at a physical layer, the non-transitory computer-readable medium comprising instructions that, when executed, cause one or more processors to perform steps of:
one or more of receiving and monitoring physical layer characteristics of a wired link at both a first network device and a second network device;
determining whether there are detectable variances in the physical layer characteristics; and
detecting a rogue network device inserted on the link based on the detectable variances, wherein the detectable variances relate to noise in the physical layer and the rogue device is detected based on the noise being greater than expected noise generated by either the first network device or the second network device.

12. The non-transitory computer-readable medium of claim 11, wherein the rogue device is a man-in-the-middle between the first network device and the second network device.

13. The non-transitory computer-readable medium of claim 11, wherein the physical layer characteristics include noise introduced in clock frequency.

14. The non-transitory computer-readable medium of claim 11, wherein the physical layer characteristics include noise introduced in jitter.

15. The non-transitory computer-readable medium of claim 11, wherein the physical layer characteristics include noise introduced in clock frequency of Ethernet Equipment Clocks (EECs).

16. The non-transitory computer-readable medium of claim 11, wherein the monitoring includes receiving encrypted values of the physical layer characteristics from each of the first network device and second network device.

17. The non-transitory computer-readable medium of claim 16, wherein the values are clock frequency.

18. A network device comprising circuitry configured to
one or more of receive and monitor physical layer characteristics of a link at both the network device and a second network device,
determine whether there are detectable variances in the physical layer characteristics, and
detect a rogue network device inserted on the link based on the detectable variances, wherein the detectable variances relate to noise in the physical layer and the rogue device is detected based on the noise being greater than expected noise generated by either the first network device or the second network device.

19. The network device of claim 18, wherein the rogue device is a man-in-the-middle between the network device and the second network device.

20. The network device of claim 18, wherein the circuitry is further configured to
subsequent to detecting the rogue network device, switch traffic between the network device and the second network device to another link on another port.

* * * * *